(12) United States Patent
Meyer et al.

(10) Patent No.: US 7,975,713 B2
(45) Date of Patent: Jul. 12, 2011

(54) CONTINUOUS GAS SERVICE RESTORATION AND METER CHANGE-OUT SYSTEM

(75) Inventors: Winston Charles Meyer, Spring, TX (US); Michael Zandaroski, Coon Rapids, MN (US); Dimitri Karastamatis, Sugar Land, TX (US); Thomas Seifert, Maple Grove, MN (US); Scott Ogren, Houston, TX (US)

(73) Assignee: Centerpoint Energy Alternative Fuels, Inc., Houston, TX (US)

( * ) Notice: Subject to any disclaimer, the term of this patent is extended or adjusted under 35 U.S.C. 154(b) by 287 days.

(21) Appl. No.: 12/198,581

(22) Filed: Aug. 26, 2008

(65) Prior Publication Data

US 2009/0173392 A1    Jul. 9, 2009

Related U.S. Application Data

(60) Provisional application No. 61/018,819, filed on Jan. 3, 2008.

(51) Int. Cl.
*G01F 15/18* (2006.01)
*F16K 43/00* (2006.01)

(52) U.S. Cl. ............ 137/15.03; 137/315.06; 312/1
(58) Field of Classification Search ......... 137/15.03, 137/315.06, 316; 312/1
See application file for complete search history.

(56) References Cited

U.S. PATENT DOCUMENTS

| | | | |
|---|---|---|---|
| 2,786,740 A * | 3/1957 | Taylor et al. | 312/1 |
| 3,656,502 A * | 4/1972 | Howe | 137/327 |
| 3,907,389 A * | 9/1975 | Cox et al. | 312/1 |
| 3,946,754 A * | 3/1976 | Cook | 137/315.06 |
| 4,327,760 A | 5/1982 | Lancaster | |
| 4,532,688 A * | 8/1985 | Dewberry | 137/315.06 |
| 4,820,000 A * | 4/1989 | Jacobson | 312/1 |
| 4,842,347 A * | 6/1989 | Jacobson | 312/1 |
| 5,437,300 A | 8/1995 | Winnie et al. | |
| 5,741,969 A * | 4/1998 | Sebastopoli | 137/15.03 |
| 5,934,304 A | 8/1999 | Peterson et al. | |

* cited by examiner

*Primary Examiner* — Kevin L Lee
(74) *Attorney, Agent, or Firm* — Baker Botts L.L.P.

(57) ABSTRACT

An assembly for maintaining flow between an inlet conduit and an outlet conduit. The assembly may include a first plate having an inlet notch sized to engage the inlet conduit and an outlet notch sized to engage the outlet conduit, and a second plate having an inlet notch sized to engage the inlet conduit and an outlet notch sized to engage the outlet conduit. The assembly may also include a bag connectable to the first and second plates and having at least one glove port. The assembly may also include a collar configured to connect the bag to the first and second plates at a perimeter formed by the first and second plates when positioned in engagement with the inlet conduit and the outlet conduit.

20 Claims, 6 Drawing Sheets

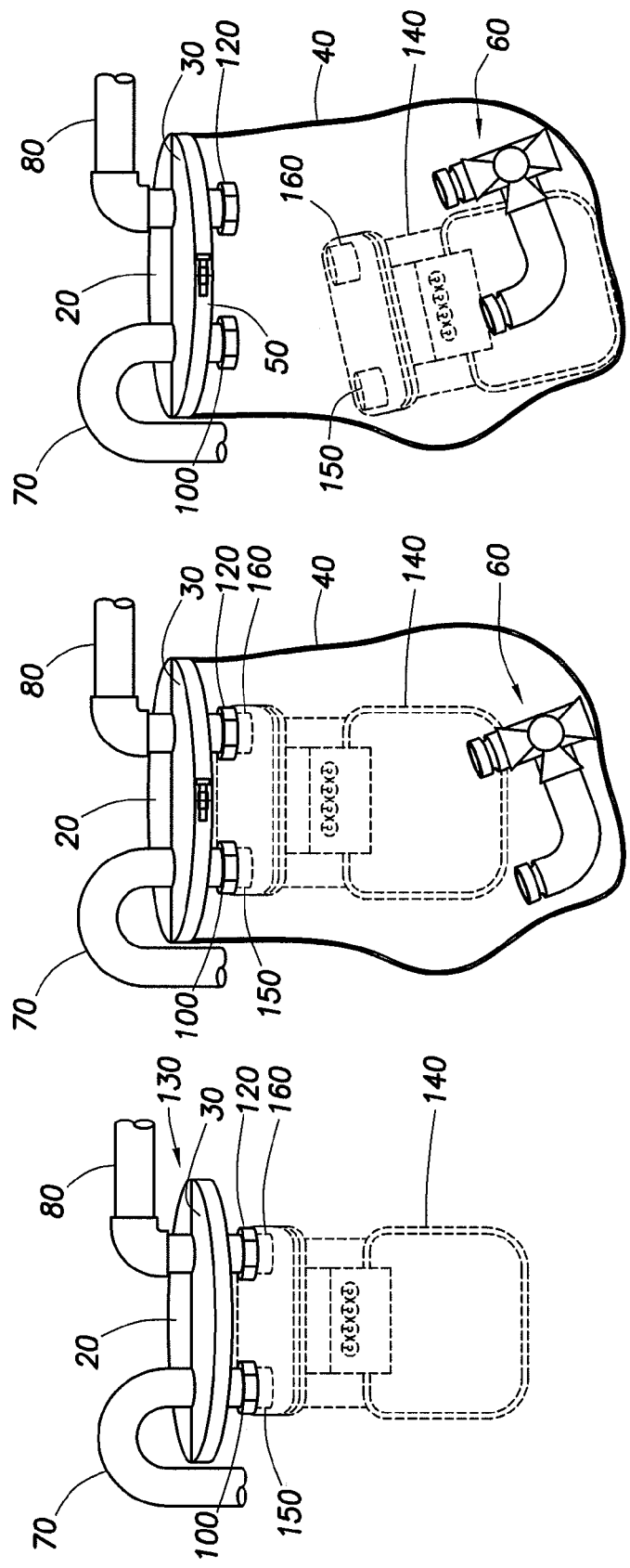

CONTINUOUS GAS SERVICE RESTORATION AND METER CHANGE-OUT SYSTEM

CROSS-REFERENCE TO RELATED APPLICATIONS

This application claims priority to U.S. Pat. App. Ser. No. 61/018,819 filed Jan. 3, 2008, which is incorporated by reference herein in its entirety.

BACKGROUND

The present invention relates to natural gas piping and, more particularly, in certain embodiments, to assemblies for providing continuous gas flow and associated methods.

To determine the amount of gas a customer consumes, a gas company interposes a gas meter in the gas line leading into each customer's building. The gas meter connects a line leading from a gas supply to a service line extending to the point of use.

The vast majority of meter sets in the United States do not have a bypass and thus require interruption of gas supply when servicing. Furthermore, providing service restoration between any inlet conduit and outlet conduit can also cause an interruption of gas service to the customer. Any interruption in gas service may cause pilot lights to become extinguished requiring the gas company to enter the premises, inspect, and relight the pilot lights. An interrupted gas service typically requires safety inspections and relighting pilot lights which result in increased costs, creates customer inconvenience, and may pose additional safety hazards. In short, interruption to gas service fosters ill will with customers, difficulty in work scheduling, additional work to perform turn-on and service restoration, and requires significant time.

SUMMARY

The present invention relates to natural gas piping and, more particularly, in certain embodiments, to assemblies for providing continuous gas flow and associated methods.

In one embodiment, an assembly for maintaining flow between an inlet conduit and an outlet conduit includes a first plate having an inlet notch sized to engage the inlet conduit and an outlet notch sized to engage the outlet conduit, a second plate having an inlet notch sized to engage the inlet conduit and an outlet notch sized to engage the outlet conduit, a bag connectable to the first and second plates and having at least one glove port, and a collar configured to connect the bag to the first and second plates at a perimeter formed by the first and second plates when positioned in engagement with the inlet conduit and the outlet conduit.

In one embodiment, a method for maintaining service between an inlet conduit and an outlet conduit, includes providing a first plate and a second plate, each having a first notch sized to engage the inlet conduit and a second notch sized to engage the outlet conduit, connecting the first plate and the second plate in engagement with the inlet conduit and the outlet conduit, providing a bag connectable to the first and second plates, and connecting the bag to the first and second plates.

In one embodiment a method for removing a gas meter includes providing a gas meter in fluid communication with an inlet conduit and outlet conduit, providing a meter change-out assembly, positioning a first plate and a second plate so that the inlet notches engage the inlet conduit and the outlet notches engage the outlet conduit, fastening the first plate and second plate together, positioning at least a portion of the bag over the first and second plates, connecting the collar to the bag and the first and second plates, and removing the meter.

The features and advantages of the present invention will be readily apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

FIGS. 5a-5e are perspective views of various stages of one embodiment of a meter change-out operation in accordance with one embodiment of the present invention.

DESCRIPTION OF PREFERRED EMBODIMENTS

The present invention relates to natural gas piping and, more particularly, in certain embodiments, to assemblies for providing continuous gas flow and associated methods.

There may be several potential advantages to the methods and apparatus of the present invention, only some of which may be alluded to herein. One of the many potential advantages of the methods and apparatuses of the present invention is that using the apparatuses and methods described herein, gas pipelines may undergo meter change-outs and other repair operations without an interruption to a customer's gas service. Another potential advantage of the methods and apparatuses of the present invention is that by using the apparatuses and methods described herein, customers' pilot lights may not become extinguished during service and thus customers may not be inconvenienced by the need to be present during meter change-outs and various gas repair operations.

Figure 1:
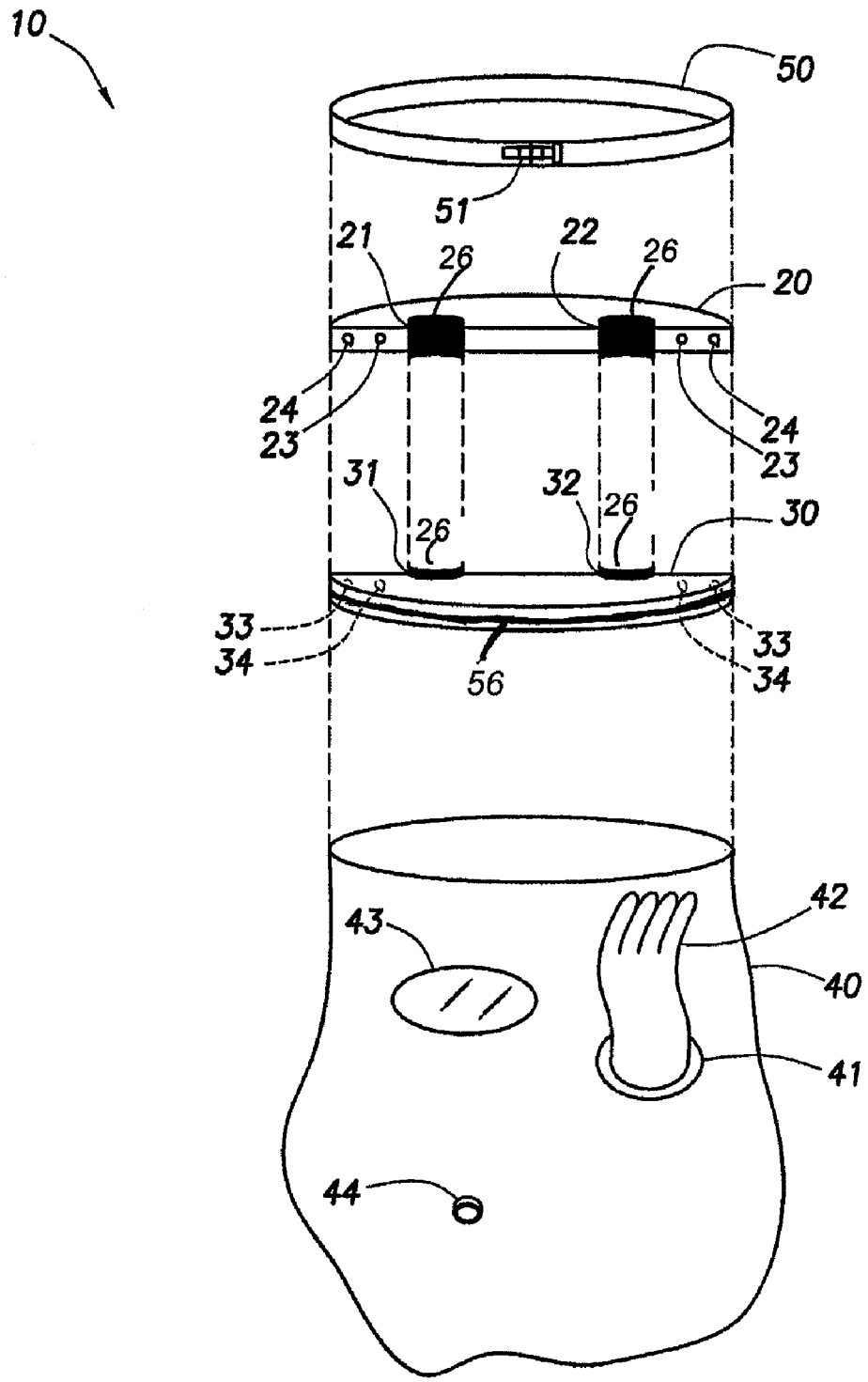
FIG. 1 is a partially exploded view of a meter change-out assembly in accordance with one embodiment of the present invention.

Referring now to FIG. 1, meter change-out assembly 10 may have a first plate 20, a second plate 30, a bag 40, and a collar 50. First plate 20 and second plate 30 may cooperate to encircle an outer wall of an inlet conduit 70 (shown in FIG. 2) and an outer wall of an outlet conduit 80 (shown in FIG. 2). Plates 20, 30 may be constructed out of any type of material. In some embodiments, plates 20, 30 may be constructed out of aluminum or other metal, plastic, wood, polyethylene, vinyl, polyvinyl chloride ("PVC"), derivatives thereof, combinations thereof, or any other material suitable for use in gas applications.

Plates 20, 30 may be substantially flat, but the term "plate" should not be limited to any particular thickness dimension. First plate 20 may have inlet notch 21 to engage the inlet conduit and outlet notch 22 to engage the outlet conduit, and second plate 30 may have similar inlet notch 31 and outlet notch 32. Notches 21, 22, 31, 32 may be semicircular, or any other shape suitable for engaging conduits 70, 80. Notches 21, 22 may be positioned along the perimeter of first plate 20 and notches 31, 32 may be positioned along the perimeter of second plate 30. Inlet notches 21, 31 and outlet notches 22, 32 may be sized and positioned to cooperatively engage the outer walls of conduits 70, 80. In certain embodiments, inlet notches 21, 31 are situated on a same general side of respective plates 20, 30 as outlet notches 22, 32.

Plates 20, 30 may be of any size or shape suitable for engaging conduits 70, 80. In certain embodiments, plates 20, 30 form an elliptical shaped perimeter when engaged with one another around conduits 70, 80. Thus, plates 20, 30 may each form a half-ellipsis. While an ellipsis is disclosed, any of a number of shapes may be formed by the union of the plates 20, 30. In certain embodiments, when engaged, the plates 20, 30 form a shape that permits bag 40 to be sealed around the perimeter. Further, plates 20, 30 need not be identical, but rather may have different shapes suitable for engagement around conduits 70, 80 in a variety of configurations. Thus, plates 20, 30 may joined about conduits 70, 80 such that conduits 70, 80 are disposed at any of an unlimited number of locations within plates 20, 30. This feature may permit accessible workspace and facilitate attachment of meter change-out assembly 10 in any number of applications, including those where meter 140 (shown in FIG. 2) is very close to a building.

In some embodiments, one or both plates 20, 30 may include rotating cams to permit adjustment of notches 21, 31, 22, and 32 to allow the centerline of notches 21, 22, 31, 32 to be adjusted or otherwise accommodate various spacing between conduits 70, 80. While rotating cams are disclosed, one skilled in the art would appreciate that various techniques may be used to adjust notches 21, 31, 22, 32 for engaging conduits 70, 80 which may vary in type, size, and relative dimensions. One of ordinary skill in the art with the benefit of this disclosure would appreciate that various embodiments may be combined to arrive at many useful mating configurations dependent upon type of meter 140, and type, size and relative dimensions of conduits 70, 80. The configurations disclosed herewith are generally by way of illustration and do not limit other configurations that may arise, that may be suitable to the application.

In some embodiments, either or both plates 20, 30 may have one or more alignment devices designed to assist in the alignment of plates 20, 30. In certain embodiments, alignment devices also prevent relative rotation between plates 20, 30 when assembled around conduits 70, 80. As illustrated, alignment devices may include pins for use in holes 23, 24, 33, and 34 situated on the same side of plates 20, 30 as notches 21, 22, 31, 32. While a particular configuration of holes 23, 24, 33, and 34 is illustrated, any number of variations of alignment devices can be used.

Bag 40 may be of any suitable size or shape. In some embodiments, bag 40 may be formed with a narrowed neck portion, allowing for sealing engagement with plates 20, 30 at the neck portion. In other embodiments bag 40 may be shaped and sized so as to be otherwise easily positioned to contact the perimeter formed by plates 20, 30 when positioned in engagement with conduits 70, 80.

Bag 40 may be constructed from derivatives of polyvinyl, reinforced vinyl, plastic, cloth, and combinations thereof, or any other material capable of holding a gas under pressure. Bag 40 may be disposable or bag 40 may be reusable. One skilled in the art would recognize that dependent upon application, materials, and conditions it may be useful to employ bag 40 which may be capable of one-time use or multiple uses. If bag 40 is reusable, it may have various interchangeable parts for replacement and/or repair.

Bag 40 may have at least one glove port 41, located at any point along the surface of bag 40. Glove port 41 may be sized to allow a person to manipulate any device or gas component located in bag 40. Glove port 41 may be constructed out of polyvinyl, plastic, cloth, or any suitable material that is capable of holding a gas under pressure and engaging a glove 42 to bag 40. In certain embodiments, glove port 41 may be welded to bag 40. Alternatively, glove port 41 may be welded by heat-shrinking, adhesives, stitching and combinations thereof, or any manner capable of creating permanent adhesion of the glove port 41 to bag 40 and capable of containing a gas under pressure. In yet other embodiments, glove port 41 may be attached semi-permanently by inter-locking plates, screws, removable fasteners, and combinations thereof capable of permitting the replacement of the glove port 41. In some embodiments, glove port 41 is configured to allow convenient detachment of glove 42 from bag 40. This may allow glove 42 to be easily replaced. Alternatively, glove port 41 may be formed by a direct connection between glove 42 and bag 40. Glove 42 may be constructed of rubber, polyvinyl, plastic, cloth, combinations thereof, or any suitable material that is capable of containing a gas under pressure. One skilled in the art would appreciate that glove 42 may be any glove, mitt or combination thereof that may permit service of the meter and various repair operations by hand or tool as may be appropriate.

Bag 40 may have at least one view port 43, located at any point along the bag 40. View port 43 may be constructed out of polyvinyl, plastic, cloth, Plexiglas®, glass, or any suitable material that permits a technician to view the interior of bag 40. Alternatively, view port 43 may be eliminated and bag 40 may be constructed out of any suitable transparent or translucent material that is capable of holding a gas under pressure.

Bag 40 may have at least one external connection port 44, located at any point along bag 40. External connection port 44 may be sized to provide gas from an external source. In some embodiments, external connection port 44 may permit the purging of gas from within bag 40. While external connection port 44 is illustrated on bag 40, it may alternatively be situated on either plate 20, 30. Further, depending on the application, multiple external connection ports 44 could be used for various purposes. Various external connection ports 44 may include but are not limited to use of a quick-disconnect or quick-connect device to facilitate engagement and disengagement of connections. In other embodiments, external connection port 44 may not be required and may be omitted.

Collar 50 may be formed to mechanically connect bag 40 to perimeter 130 (shown in FIG. 2) formed when mated plates 20, 30 are engaged with conduits 70, 80. In some embodiments, collar 50 may be a stainless steel band that encircles and clamps to plates 20, 30 and surrounding bag 40. In these embodiments, fastener 51 may clamp collar 50 around bag 40 to plates 20, 30 via tool adjustment. In other embodiments, fastener 51 may be adjustable via hand, or otherwise, to a tension adequate to maintain a seal that permits gas containment. Collar 50 may be constructed out of metal, plastic, PVC, rubber, elastomer, polymers, fabrics, or any other suitable material. While a band-shaped collar is shown, collar 50 may be of any suitable shape or size. For example, in certain embodiments, collar 50 may be disposed within the outer edge of the open end of bag 40.

In some embodiments, meter change-out assembly 10 may include a support assembly (not shown) to provide support to plates 20, 30 when attached to conduits 70, 80. Support assembly may additionally maintain distance between conduits 70, 80 and provide support for meter 140 (shown in FIG. 2) within bag 40. Meter 140 may be supported via support strap (not shown) connected to meter 140 at one end and connected to support assembly at the other. In certain embodiments, support assembly may be a split bar, support plate or support structure formed into plates 20, 30, combinations thereof or any device that may provide appropriate support for plates 20, 30. As one skilled in the art would appreciate, there are many methods for providing additional support to plates 20,30 and support assembly may or may not be required depending upon the application.

In some embodiments, meter change-out assembly 10 may include one or more seals to minimize or prevent gas leaks around and between the various components of meter change-out assembly 10. For example, as shown in FIG. 1, in one embodiment seals 26 may be placed between the plates 20, 30 and the conduits 70, 80. Similarly, seal 56 may be placed between the plates 20, 30 and collar 50. In some embodiments, bag 40 may be capable of self-sealing around the perimeter of plates 20, 30. In other embodiments, the seal may be a strip of material, an o-ring or any other type of seal capable of minimizing or preventing gas leaks. One skilled in the art would possess suitable technical knowledge to ensure that the seal would maintain a sufficient engagement between and around plates 20, 30 and the various components of meter change-out assembly 10 to ensure gas may be suitably contained under pressure.

Figure 2:
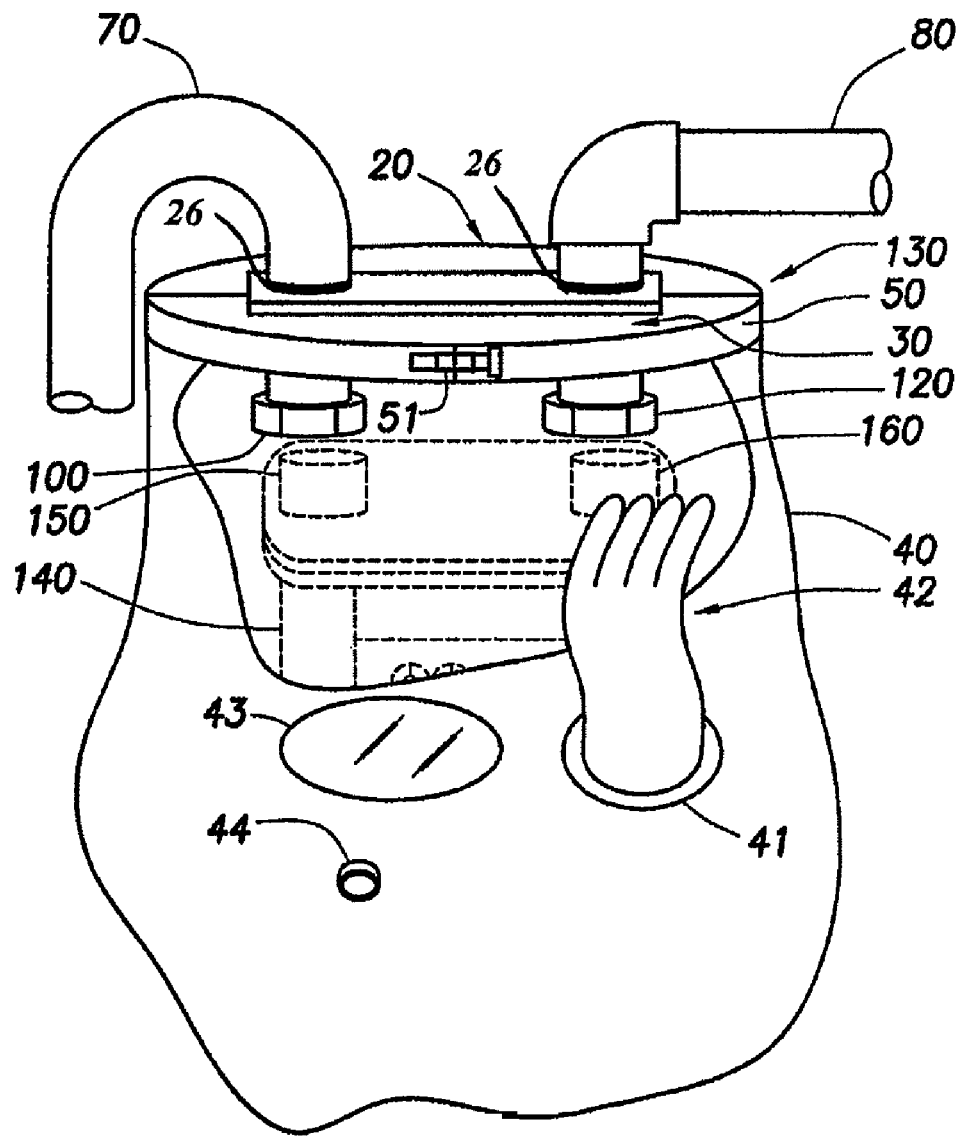
FIG. 2 is a perspective view of a meter change-out assembly installed over a gas meter in accordance with one embodiment of the present invention.

Referring now to FIG. 2, one embodiment of the meter change-out assembly 10 is illustrated installed around conduits 70, 80. Gas meter 140 may be connected to conduits 70, 80. Inlet conduit 70 may be in fluid communication with meter inlet 150. Outlet conduit 80 may be in fluid communication with meter outlet 160. Plate 20, 30 may be positioned in engagement with conduits 70, 80. Perimeter 130 may be formed along the unmated sides of plates 20, 30 when positioned in engagement with conduits 70, 80. Bag 40 may be positioned along the outside of perimeter 130 and collar 50 connects bag 40 to perimeter 130.

Figure 3:
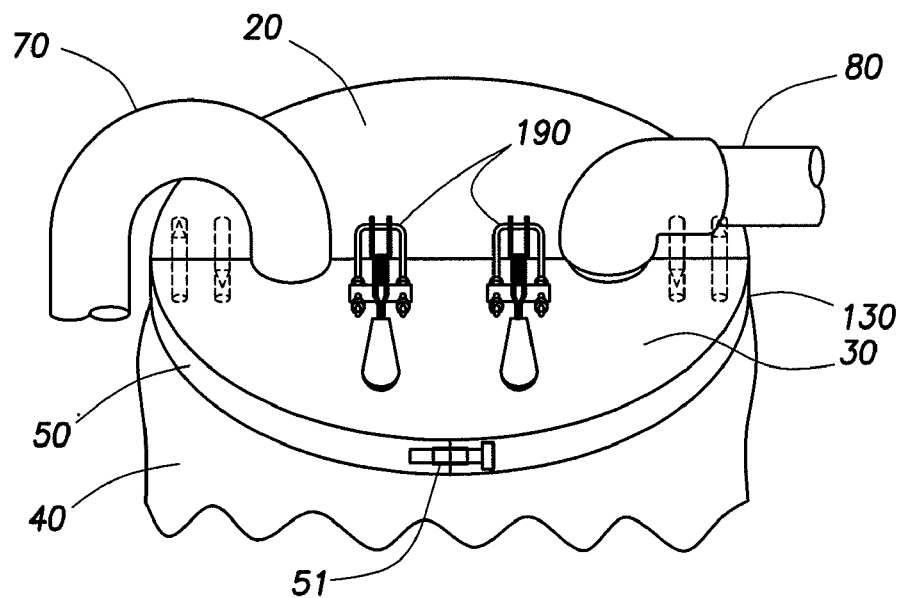
FIG. 3 is a perspective view of a first plate and a second plate having a fastener and alignment devices, installed around an inlet conduit and an outlet conduit in accordance with one embodiment of the present invention.

Referring now to FIG. 3, plates 20, 30 may optionally be held in position about conduits 70, 80 by at least one fastener 190. Fastener 190 may be a latch, clamp, screw, or any other device suitable for joining plates 20, 30.

Figure 4A:
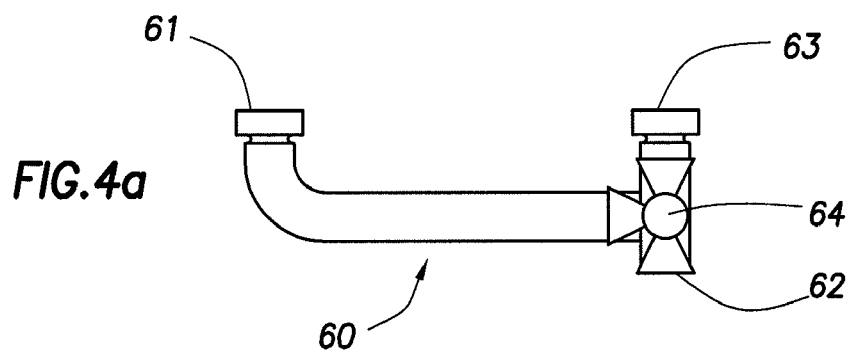
FIGS. 4a and 4b are side views of various embodiments of a bypass assembly.
Figure 4B:
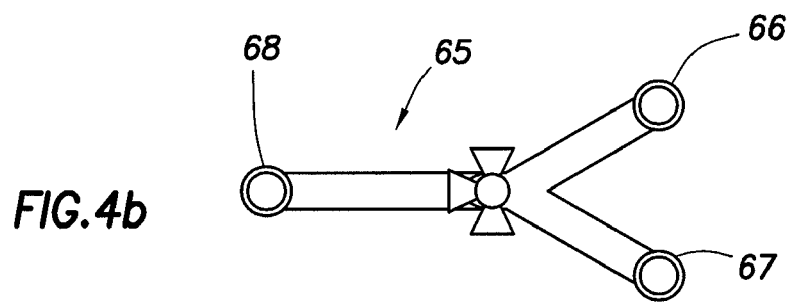

Referring now to FIGS. 4a and 4b, a bypass assembly may be used to switch to external gas flow. In one embodiment, illustrated in FIG. 4a, bypass assembly is a 3-way valve 60. 3-way valve 60 may have inlet 61, inlet 62, outlet 63, and control mechanism 64. Inlet 61 may be configured for connection to inlet conduit 70, inlet 62 may be configured for connection to an external gas supply, and outlet 63 may be configured for connection to outlet conduit 80. Control mechanism 64 may be manipulated to allow gas flow to switch from inlet 61-outlet 63 to inlet 62-outlet 63 or otherwise. In other words, flow to outlet conduit 80 may selectively come from either inlet conduit 70 or an external gas supply.

In other embodiments, the bypass assembly may be a T-valve or Y-valve 65, as shown in FIG. 4b. Y-valve 65 may have inlet/outlet 66, inlet/outlet 67, and inlet/outlet 68. A person of ordinary skill in the art would be able to determine an appropriate type and size of Y-valve 65.

Any of a number of different bypass assemblies may be useful in conducting meter change-outs and gas repair operations. The bypass assembly may be constructed out of reinforced polyvinyl tubing, plastic, metal, rubber, a combination thereof, or any suitable material that is capable of holding a gas under pressure and engaging one or both conduits 70, 80. The bypass assembly may be sized to fit, for example, but not by way of limitation, relative spacing of 6", 8", or 12" between conduits 70, 80. A person of ordinary skill in the art would be able to determine an appropriate type, relative dimensions, and size of the bypass assembly for various applications. In certain embodiments, the bypass assembly may be telescoping or otherwise adjustable to permit for variation in dimensions of conduits 70, 80.

Figure 5E:
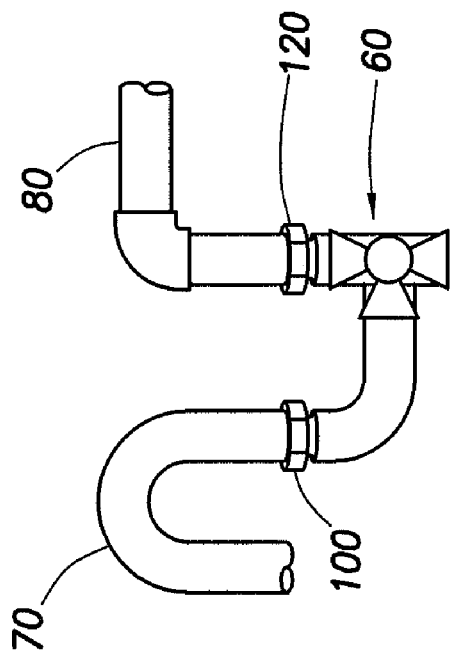
Figure 5D:
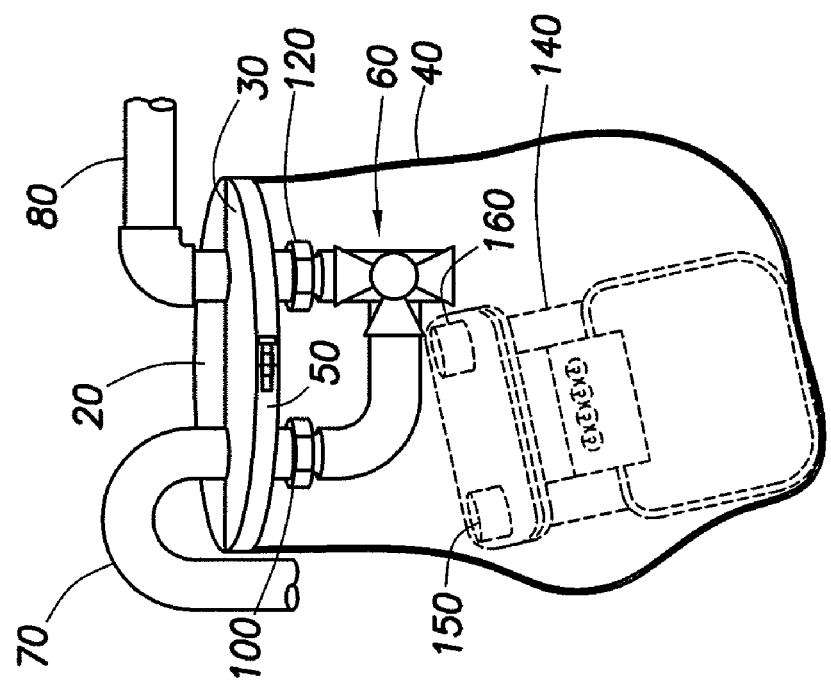

FIG. 5a-5e illustrate the various stages of one embodiment of a meter change-out operation using the meter change-out assembly 10 of the present invention. FIG. 5a illustrates meter 140 with support assembly (not shown) in place. Gas meter 140 is shown in fluid communication with inlet conduit 70 and outlet conduit 80. In particular, inlet conduit 70 is shown in fluid communication with meter inlet 150 and outlet conduit 80 is in fluid communication with meter outlet 160. The support assembly may be installed around conduits 70, 80, such that it can support plates 20, 30 and/or meter 140. Referring now to FIG. 5b, plates 20, 30 may be positioned so that notches 21, 22, 31, and 32 engage conduits 70, 80. Perimeter 130 may be formed around plates 20, 30, as they are positioned. Plates 20, 30 may then be fastened together. A strap or other meter support mechanism (not shown) may be used to attach a replacement meter to support assembly to support the weight of the replacement meter without support from bag 40. Alternatively, bag 40 may be constructed of reinforced materials, or otherwise configured to permit meter 140 to be supported by bag 40. Before bag 40 is connected, connections 100, 120 are loosened from meter conduits 150, 160 and 3-way valve 60 may be placed in bag 40. Bag 40 may be positioned along perimeter 130, such that at least a portion of bag 40 covers perimeter 130. After the bag 40 has been connected, bag 40 may be pressurized with gas before disconnecting meter 140. As illustrated in FIG. 5c, meter 140 may be disconnected from conduits 70, 80 by use of glove 42 to manipulate inlet connection 100 and outlet connection 120 associated with meter inlet 150 and meter outlet 160, respectively. After meter 140 is disconnected, fluid flow to outlet conduit 80 may be provided via pressurized gas within bag 40. Further, as illustrated in FIG. 5c, meter 140 and 3-way valve 60 may be permitted to rest in the bag 40 while bag 40 remains under pressure. Referring now to FIG. 5d, inlet 61 of 3-way valve 60 (which was already present in bag 40) may then be attached to gas inlet conduit 70, and outlet 63 of 3-way valve 60 may then be attached to gas outlet conduit 80 allowing gas to flow from inlet conduit 70, through 3-way valve 60, to outlet conduit 80. Referring now to FIG. 5e, bag 40 may then be removed, and in some embodiments, an external gas source may be connected to inlet 62 of 3-way valve 60. Switch 64 of 3-way valve 60 may then be switched to allow gas flow between inlet 61, inlet 62, outlet 63, or a combination thereof by adjusting the 3-way valve 60.

In other representative embodiments, an external gas source may be connected to external connection port 44 so that gas flow is not disrupted when bag 40 is removed. Y-valve assembly 65 may be attached to external connection port 44 and outlet conduit 80 while still within bag 40. Bag 40 may then be removed from perimeter 130. In some embodiments, an external gas source may be connected to Y-valve assembly 65 through external gas port 44 located on plates 20, 30.

In some embodiments, any or all components of meter change-out assembly 10 may be formed so as to be operable in the temperature range of −20° F. to 150° F. In other embodiments, meter change-out assembly 10 may be formed so as to be operable in smaller temperature ranges, depending on the anticipated operating conditions. In other embodiments the components of meter change-out assembly 10 may be formed such that bag 40 may be inflated up to about 2 psig or up to about 5 psig without a substantial pressure loss. In some embodiments, the change-out procedure may be completed without the use of any tools (other than a wrench to loosen the existing connections).

Figure 6:
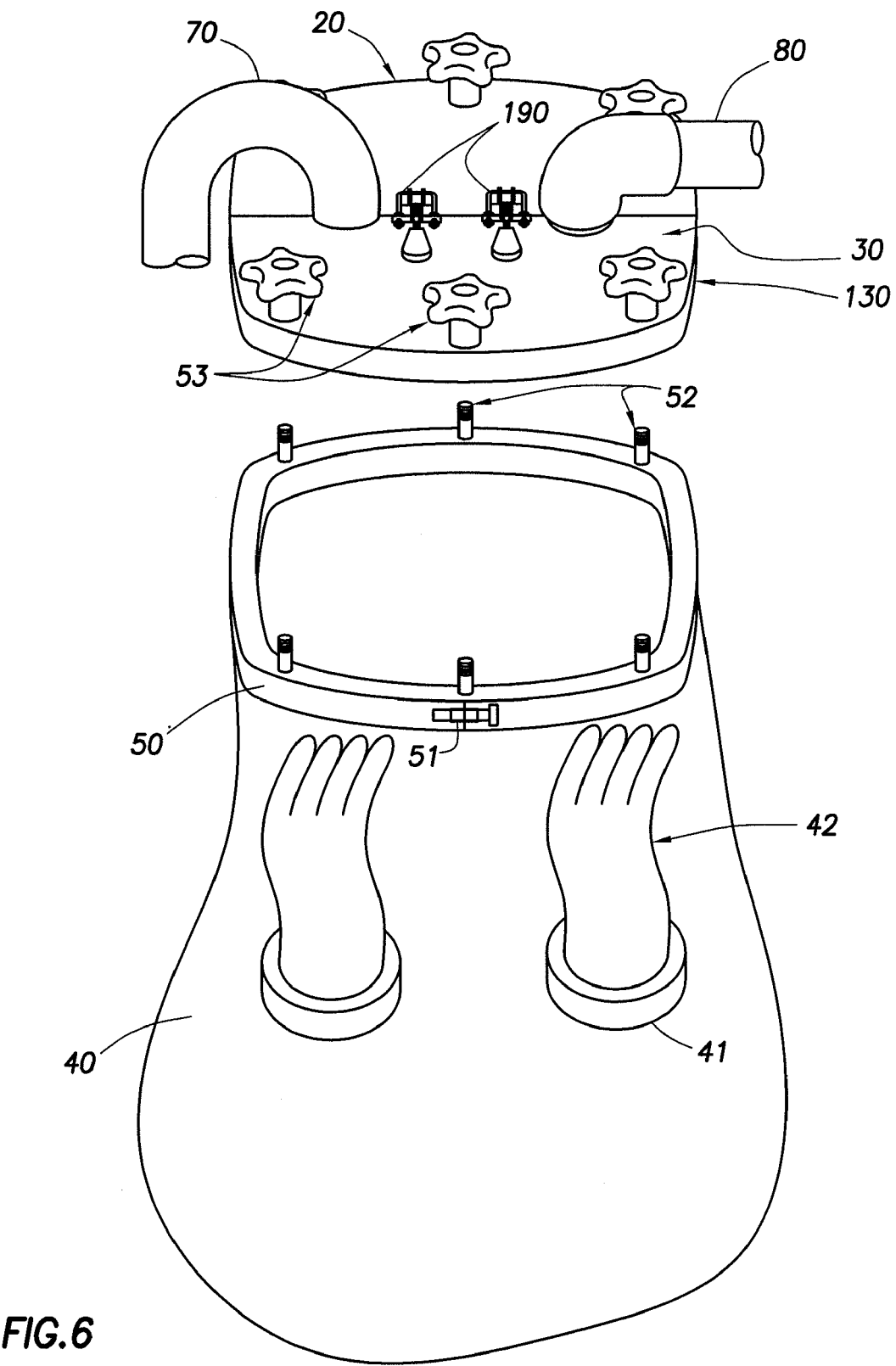
FIG. 6 is a partially exploded view of a gas service restoration and meter change-out assembly in accordance with one embodiment of the present invention.

FIG. 6 illustrates one embodiment of the gas service restoration and meter-change-out assembly which may be tool-free. First plate 20 and second plate 30 may cooperate to encircle an outer wall of an inlet conduit 70 and an outer wall of an outlet conduit 80. Plates 20, 30 may be constructed out of any type of material. In some embodiments, plates 20, 30 may be constructed out of aluminum or other metal, plastic, wood, polyethylene, vinyl, polyvinyl chloride ("PVC"), derivatives thereof, combinations thereof, or any other material suitable for use in gas applications.

Plates 20, 30 may be substantially flat, but the term "plate" should not be limited to any particular thickness dimension. First plate 20 may have inlet notch 21 (shown in FIG. 1) to engage the inlet conduit and outlet notch 22 (shown in FIG. 1) to engage the outlet conduit, and second plate 30 may have similar inlet notch 31 (shown in FIG. 1) and outlet notch 32 (shown in FIG. 1). Notches 21, 22, 31, 32 may be semicircular, or any other shape suitable for engaging conduits 70, 80. Notches 21, 22 may be positioned along the perimeter of first plate 20 and notches 31, 32 may be positioned along the perimeter of second plate 30. Inlet notches 21, 31 and outlet notches 22, 32 may be sized and positioned to cooperatively engage the outer walls of conduits 70, 80. In certain embodiments, inlet notches 21, 31 are situated on a same general side of respective plates 20, 30 as outlet notches 22, 32.

Plates 20, 30 may be of any size or shape suitable for engaging conduits 70, 80. In certain embodiments, plates 20, 30 may form any shaped perimeter which permits engagement with collar 50. Further, plates 20, 30 need not be identical, but rather may have different shapes suitable for engagement around conduits 70, 80 in a variety of configurations. Thus, plates 20, 30 may joined about conduits 70, 80 such that conduits 70, 80 are disposed at any of an unlimited number of locations within plates 20, 30. This feature may permit accessible workspace and facilitate attachment of meter change-out assembly 10 (shown in FIG. 1) in any number of applications, including those where meter 140 (shown in FIG. 2) is very close to a building.

In some embodiments, one or both plates 20, 30 may include star knobs 53 to facilitate tool-free engagement of collar 50 to plates 20, 30 utilizing threaded fasteners 52. While rotating star knobs 53 are disclosed, one skilled in the art would appreciate that various techniques may be used to provide for engaging plates 20, 30 which may vary in type, size, and relative dimensions. In some embodiments, plates 20, 30 may have not have star knobs 53 attached to plates 20, 30. In other embodiments, plates 20, 30 may be designed to permit alignment with threaded fasteners 52 of collar 50, and star knobs 53 may be removed, loosened or tightened by hand to secure and release engagement of plates 20, 30 to collar 50. While star knobs 53 and threaded fasteners 52 are disclosed herein, one of ordinary skill in the art with the benefit of this disclosure would appreciate that various embodiments may be combined to arrive at many useful mating configurations dependent upon type of meter 140 (shown in FIG. 2), and type, size and relative dimensions of conduits 70, 80. The configurations disclosed herewith are generally by way of illustration and do not limit other configurations that may arise, that may be suitable to the application.

In some embodiments, meter change-out assembly 10 may include one or more seals (not shown) to minimize or prevent gas leaks around and between the various components of meter change-out assembly 10, such as, but not limited to, between the plates 20, 30 and the conduits 70, 80 or between the plates 20, 30 and collar 50. In some embodiments, bag 40 may be capable of self-sealing around the perimeter of collar 50. In yet other embodiments, bag 40 may be sealed around collar 50 utilizing a fastener 51 to create a seal between bag 40 and collar 50. In other embodiments, the seal may be a strip of material, an o-ring or any other type of seal capable of minimizing or preventing gas leaks. One skilled in the art would possess suitable technical knowledge to ensure that the seal would maintain a sufficient engagement between and around plates 20,30 and the various components of meter change-out assembly 10 to ensure gas may be suitably contained under pressure.

One skilled in the art would appreciate that the various embodiments of the invention apparatus and embodiments of the invention methods disclosed herein can be modified by a substantial degree of permutations. While natural gas is generally stable, additional procedures and steps may be useful in enhancing the safety of any apparatus or method dealing with natural gas. By way of example, the use of an anti-static bar or grounding rod to discharge static energy away from meter change-outs or service restoration operations is a commonly accepted safety procedure and use of such techniques is envisioned within various embodiments of the invention. Likewise, one skilled in the art may find the use of anti-static spray or various other static discharge methods useful in constructing or using bag 40, collar 50, or external port 44. The disclosure of anti-static spray for use with embodiments of the invention mentioned above are intended to be only illustrative. There are various techniques and advantages to utilizing anti-static sprays, grounding rods, and similar discharge techniques with various embodiments of the invention that one skilled in the art would appreciate and adapt from application to application depending upon the goals and purposes desired.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. While gas meters and gas lines are disclosed herein, one of ordinary skill in the art will appreciate that the invention is suited for a number of applications where it is desirable to maintain flow through a line while performing repairs. Thus, this invention should not be limited to gas meter replacement operations. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Moreover, the indefinite articles "a" or "an", as used in the claims, are defined herein to mean one or more than one of the element that it introduces. Also, the terms in the claims have their plain, ordinary meaning unless otherwise explicitly and clearly defined by the patentee.

What is claimed is:

1. An assembly for maintaining fluid flow between an inlet conduit and an outlet conduit, the assembly comprising:
   a first plate having an inlet notch sized to engage the inlet conduit and an outlet notch sized to engage the outlet conduit;
   a second plate having an inlet notch sized to engage the inlet conduit and an outlet notch sized to engage the outlet conduit;
   a bag connectable to the first and second plates and having at least one glove port; and
   a collar configured to connect the bag to the first and second plates at a perimeter formed by the first and second plates when engaged with the inlet conduit and the outlet conduit.

2. The assembly of claim 1 further comprising a support assembly capable of supporting the first and second plates when engaged with the inlet conduit and the outlet conduit.

3. The assembly of claim 1, comprising at least one seal between the first and second plates and the inlet and outlet conduits.

4. The assembly of claim 1, comprising at least one alignment device configured to align the first and second plates.

5. The assembly of claim 1, comprising at least one bypass assembly to connect with the inlet and outlet conduits.

6. The assembly of claim 1, wherein the bag is disposable.

7. The assembly of claim 1, wherein the first and second plate material comprises a material chosen from at least one of the following: metal, plastic, wood, polyethylene, vinyl, polyvinyl chloride, derivatives thereof, and combinations thereof.

8. The assembly of claim 1, comprising at least one fastener to engage the first and second plates.

9. The assembly of claim 1, comprising at least one seal between the perimeter and the collar.

10. The assembly of claim 1, wherein the bag material comprises a material chosen from at least one of the following: polyvinyl, reinforced vinyl, plastic, cloth, derivatives thereof, and combinations thereof.

11. The assembly of claim 1, wherein the bag material comprises a material chosen from at least one of the following: transparent material, translucent material, derivatives thereof, and combinations thereof.

12. A method for maintaining fluid flow between an inlet conduit and an outlet conduit, the method comprising:
   providing a first plate and a second plate, each having a first notch sized to engage the inlet conduit and a second notch sized to engage the outlet conduit;
   mating the first plate and the second plate in engagement with the inlet conduit and the outlet conduit;
   providing a bag connectable to the first and second plates; and
   connecting the bag to the first and second plates.

13. The method of claim 12, comprising pressurizing the bag.

14. The method of claim 12, comprising:
   loosening connections between a meter and the inlet conduit and the outlet conduit;
   wherein the step of loosening the connections is performed prior to connecting the bag.

15. The method of claim 12, comprising:
   removing a meter connected to the inlet conduit and the outlet conduit;
   wherein the step of removing the meter is performed after connecting the bag.

16. The method of claim 14, wherein the step of providing the bag comprises providing a bypass assembly within the bag, the method further comprising:
   fluidly connecting the bypass assembly to the outlet conduit after removing the meter so as to maintain substantially constant pressure.

17. The method of claim 16, further comprising fluidly connecting the bypass assembly to the inlet conduit.

18. The method of claim 12, wherein the step of providing the bag comprises providing a bypass assembly within the bag, the method comprising:
   loosening connections between a meter and the inlet conduit and the outlet conduit;
   pressurizing the bag;
   removing the meter;
   fluidly connecting the bypass assembly to the outlet conduit;
   wherein the removing is performed after the connecting the bag
   wherein fluidly connecting the bypass assembly is performed after removing the meter.

19. The method of claim 18, further comprising fluidly connecting the bypass assembly to the inlet conduit.

20. A method for removing a gas meter, the method comprising:
   providing a gas meter in fluid communication with an inlet conduit and outlet conduit;
   providing a meter change-out assembly comprising;
      a first plate having an inlet notch sized to engage the inlet conduit and an outlet notch sized to engage the outlet conduit;
      a second plate having an inlet notch sized to engage the inlet conduit and an outlet notch sized to engage the outlet conduit;
      a bag connectable to the first and second plates and having at least one glove port and at least one external connection port; and
      a collar configured to connect the bag to the first and second plates at a perimeter formed by the first and second plates when positioned in engagement with the inlet conduit and the outlet conduit
   positioning the first plate and the second plate so that the inlet notches engage the inlet conduit and the outlet notches engage the outlet conduit;
   fastening the first plate and second plate together;
   positioning at least a portion of the bag over the first and second plates;
   connecting the collar to the bag and the first and second plates; and
   removing the meter.

* * * * *